(12) United States Patent
John et al.

(10) Patent No.: US 12,105,625 B2
(45) Date of Patent: Oct. 1, 2024

(54) PROGRAMMABLE MULTI-LEVEL DATA ACCESS ADDRESS GENERATOR

(71) Applicant: Ceremorphic, Inc., San Jose, CA (US)

(72) Inventors: Lizy Kurian John, Austin, TX (US); Venkat Mattela, San Jose, CA (US); Heonchul Park, Pleasanton, CA (US)

(73) Assignee: Ceremorphic, Inc., San Jose, CA (US)

( * ) Notice: Subject to any disclaimer, the term of this patent is extended or adjusted under 35 U.S.C. 154(b) by 285 days.

(21) Appl. No.: 17/588,240

(22) Filed: Jan. 29, 2022

(65) Prior Publication Data

US 2023/0244599 A1    Aug. 3, 2023

(51) Int. Cl.
*G06F 12/04* (2006.01)
*G06N 3/0464* (2023.01)
*G06N 3/10* (2006.01)

(52) U.S. Cl.
CPC .......... *G06F 12/04* (2013.01); *G06N 3/0464* (2023.01); *G06N 3/10* (2013.01); *G06F 2212/16* (2013.01)

(58) Field of Classification Search
None
See application file for complete search history.

(56) References Cited

U.S. PATENT DOCUMENTS

| | | | | |
|---|---|---|---|---|
| 7,010,664 B1 * | 3/2006 | Ballagh | ................... | G06F 9/345 711/100 |
| 11,630,800 B2 * | 4/2023 | Hung | ..................... | G06F 9/345 712/7 |
| 2004/0174766 A1 | 9/2004 | Dreux | | |
| 2010/0153654 A1 | 6/2010 | Vorbach et al. | | |
| 2016/0321074 A1 * | 11/2016 | Hung | ................... | G06F 9/30072 |
| 2020/0293867 A1 | 9/2020 | Shao et al. | | |
| 2021/0382820 A1 | 12/2021 | Mindru | | |
| 2023/0244600 A1 * | 8/2023 | John | ...................... | G06N 3/063 706/15 |

FOREIGN PATENT DOCUMENTS

EP    0201174 B1 *    3/1986    ............. G06F 9/345

OTHER PUBLICATIONS

Machine Translation of Japanese Patent Application JP H08241293 A, 1996. (Year: 1996).*
Dinda et al., 'Fast Message Assembly Using Compact Address Relations' copyright ACM, 1996. (Year: 1996).*

(Continued)

*Primary Examiner* — Steven G Snyder
(74) *Attorney, Agent, or Firm* — File-EE-Patents.com; Jay A. Chesavage

(57) ABSTRACT

A programmable address generator has an iteration variable generator for generation of an ordered set of iteration variables, which are re-ordered by an iteration variable selection fabric, which delivers the re-ordered iteration variables to one or more address generators. A configurator receives an instruction containing fields which provide configuration constants to the address generator, iteration variable selection fabric, and address generators. After configuration, the address generators provide addresses coupled to a memory. In one example of the invention, the address generators generate an input address, a coefficient address, and an output address for performing convolutional neural network inferences.

18 Claims, 13 Drawing Sheets

(56) References Cited

OTHER PUBLICATIONS

Machine Translation of WIPO Publication WO 2022206969 A1, 2022. (Year: 2022).*
Wijerathne et al "Cascade: High THroughput Data Streaming Via Decoupled Access-Execute CGRA" in ACM Transactions on Embedded Computing Systems, vol. 18, Issue 5s; Oct. 2019 [online] https://dl.acm.org/doi/10.1145/3358177.
International Search Report dated Feb. 24, 2023.

\* cited by examiner

Figure 1A
RISC code for address generation

```
$32:
    lw   $24,8004($sp)    ; load current i to R24      ;(OMA); Overhead memory access
    mul  $25,$24,4        ; i times data size to R25   ;(ADDR); Address arithmetic
    addu $8,$sp,8008      ; Array start address        ;(ADDR); Address arithmetic
    addu $9,$25,$8        ; Base address in R9         ;(ADDR); Address arithmetic
    lw   $10,-4008($9)    ; operand x(i) to R10        ;(ACC); Data access
    mul  $11,$15,$10      ; a*x(i) { R15 contains a    ;(EXE); Execute
    lw   $12,-8008($9)    ; operand y to R12           ;(ACC); Data access
    addu $13,$12,$11      ; y(i) + a*x(i)              ;(EXE); Execute
    sw   $13,-8008($9)    ; save new y                 ;(ACC); Data access
    lw   $14,8004($sp)    ; load current index         ;(OMA); Overhead memory Access
    addu $24,$14,1        ; increment index            ;(ADDR); Address arithmetic
    sw   $24,8004($sp)    ; store new index back       ;(OMA); Overhead memory Access
    blt  $24,1000,$32     ; inner loop ends            ;(BR); Branch
```

Figure 1B

CNN Loop equation $$O[i7][i6][i5][i4] = \text{Activation}\{\underbrace{B[i6]}_{\substack{122\\ \text{Biases}}} + \sum_{i3=0}^{D3-1}\sum_{i2=0}^{D2-1}\sum_{i1=0}^{D1-1} \underbrace{\text{Input}[i7][i1][U*i5+i3][U*i4+i2]}_{\substack{124\\ \text{Input fmaps}}} * \underbrace{W[i6][i1][i3][i2]}_{\substack{126\\ \text{Filter Weights}}}\}$$

120
Output Maps

Figure 1C

Seven level nested Convolutional Neural Network loop code

```
for (i7=0; i7<D7; i7++){
  for (i6=0; i6<D6; i6++){
    for (i5=0; i5<D5; i5++){
      for (i4=0; i4<D4; i4++){
        O[i7][i6][i5][i4] = B[i6]
        for (i3=0; i3<D3; i3++){
          for (i2=0; i2<D2; i2++){
            for (i1=0; i1<D1; i1++){
              O[i7][i6][i5][i4] += Input[i7][i1][U*i5+i3][U*i4+i2] * W[i6][i1][i3][i2];
            }
          }
        }
        O[i7][i6][i5][i4] = Activation(O[i7][i6][i5][i4])
      }
    }
  }
}
```

Data Organization in RAM

Generalized Address Generator

Nested Loop Iteration Variable Generator 4 dimensional tensor W (Weight) & O (Output) address generator

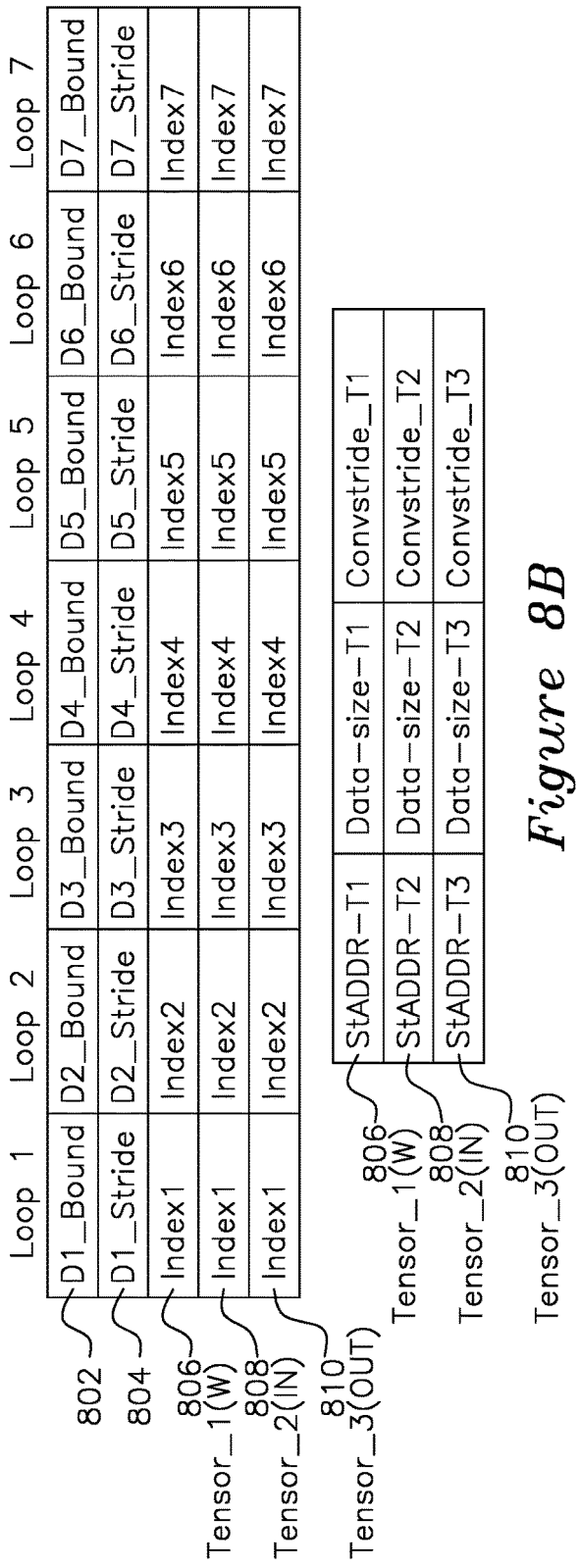
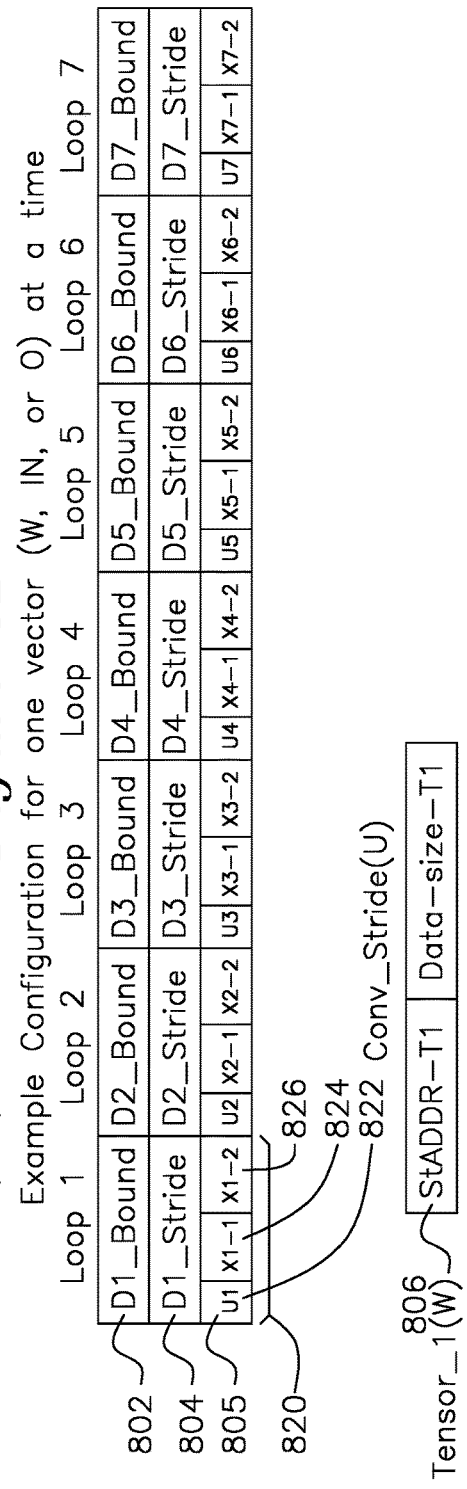

Example Three vector configuration instruction

Example Three vector configuration instruction

Example Fully Programmable and Reconfigurable Iteration Loop

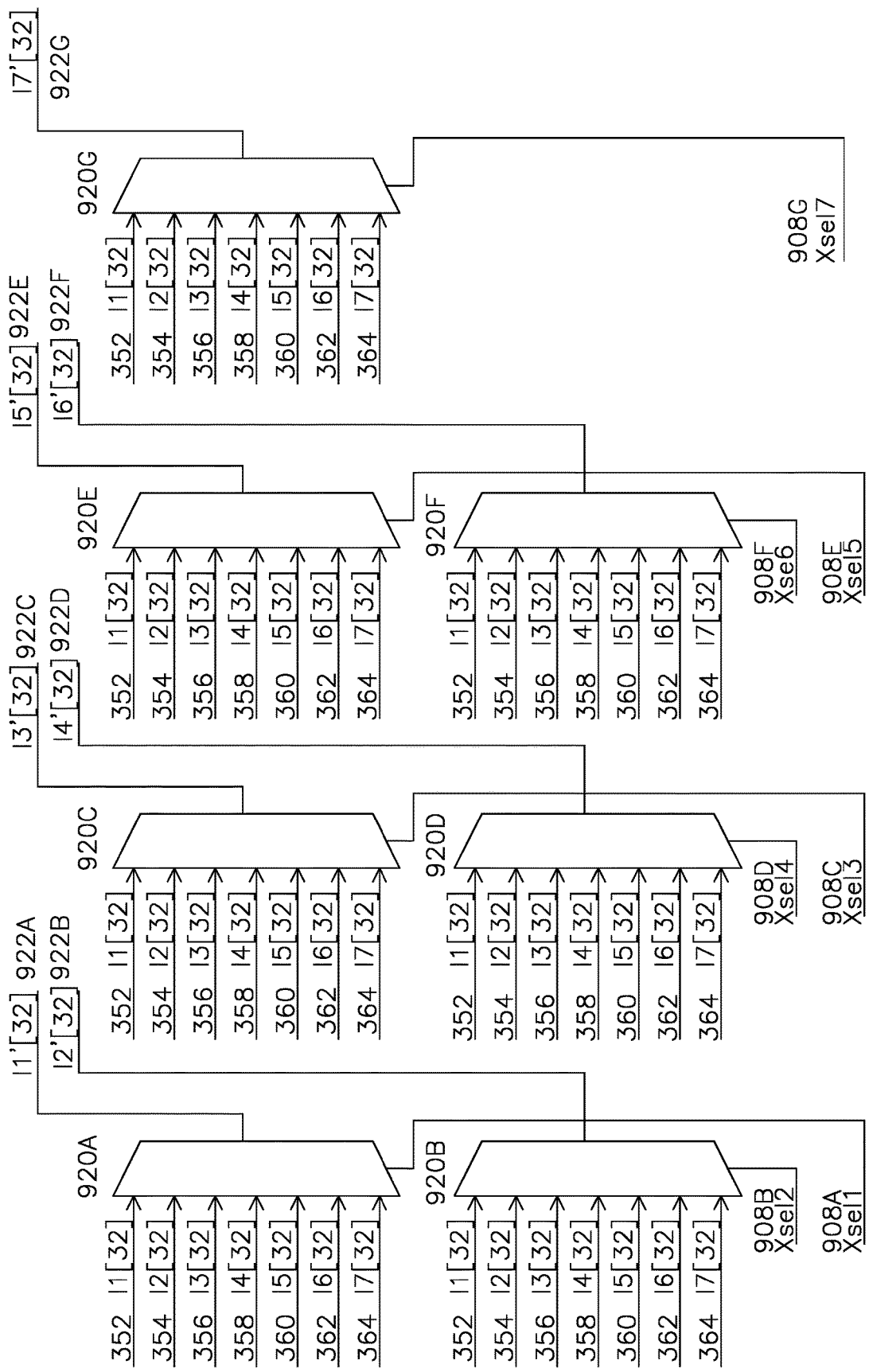

PROGRAMMABLE MULTI-LEVEL DATA ACCESS ADDRESS GENERATOR

FIELD OF THE INVENTION

The present invention relates to an apparatus and method for addressing an array of multi-dimensional data. In particular, the apparatus and method provides for quick access to multi-dimensional data stored in a memory for use by a convolutional neural network (CNN) and high performance computing that uses nested loops.

BACKGROUND OF THE INVENTION

Generation of a plurality of iteration variables for access to high-dimension arrays of data is valuable in diverse applications such as computer vision, image processing, molecular biology, computational chemistry, physics simulations, aerodynamic applications, and other fields involving large amounts of data requiring analysis and classification, and in the prior art of several different programming languages such as python and many others is provided using "for" statements. One such application for accessing high-dimension arrays of data is Deep learning (DL), a popular artificial intelligence method, which uses neural networks with many hidden (inner) layers between the input and output layers. Many of the hidden layers use convolutional neural networks (CNNs), which have proven to be very successful in providing inferences for identification and classification of data. CNNs have been very popular because of their high accuracy and ability to be trained on a dataset, however, these benefits come at the cost of high computational complexity. The CNN computational method involves high-dimensional convolutions with hundreds of filters and channels and involves large amounts of computations, large amounts of data retrieval and mathematical data operations, and operating on arrays of input data and arrays of coefficient data to compute the output data. The input data and coefficient data is typically organized in large arrays or matrices or other high dimensional structures.

When data is organized in large data structures, it is typically arranged in multi-dimensional matrix form, and each of the arrays, matrices, or tensors may have two or more dimensions of indices, requiring simultaneous access of the multiple arrays to address the input and output data used in each CNN computation.

It is desired to provide an apparatus and method for accessing multi-dimensional data in a CNN by the generation of addresses which rely on multiple iteration variables. It is further desired to provide memory addresses for input data coefficient data, and output data, where the addresses may be pre-fetched and saved in a queue or memory, or used in an instant calculation for addressing separate memories or a shared memory.

OBJECTS OF THE INVENTION

A first object of the invention is an address generator for addressing multiple arrays of data, the address generator receiving a plurality of input iteration variables from an iteration variable generator, the iteration variable generator coupled to a mapping function for reassigning iteration variable order, at least two iteration variables of the iteration variable generator having an associated bound governing the lower and upper limit of the associated iteration variable, the address generator also receiving a convolution stride U having an integer value greater than 0 and representing a granularity of the convolution such that the greater the convolution stride, the more sparse the convolution, the convolution stride U multiplied with a unique iteration variable to form a first product, the convolutional stride multiplied by a unique iteration variable to form a second product, the first product and second product multiplied together and added to a first bound to form a first output, the first output multiplied with a unique iteration variable and added to a product of the first bound and a second bound to form a second output, the second output multiplied with a unique iteration variable and added to a product of the first bound, second bound, and a third bound to form an address index for application to a memory.

A second object of the invention is an address generator for addressing multiple arrays of data, the address generator receiving a plurality of input iteration variables which are optionally re-mapped iteration variables, at least two iteration variables having an associated bound governing a bound of the associated iteration variable, the address generator also receiving a convolutional stride U, the convolutional stride U multiplied with a unique iteration variable to form a first product, the convolutional stride multiplied by a unique iteration variable to form a second product, the first product and second product multiplied together and added to a first bound to form a first output, the first output multiplied with a unique iteration variable and added to a product of the first bound and a second bound to form a second output, the second output multiplied with a unique iteration variable and added to a product of the first bound, second bound, and a third bound to form an address index, the address index multiplied by a data-size and added to a start address to form an input address for application to a memory.

A third object of the invention is an address generator operating on a plurality of iteration variables, a convolutional stride, and a first bound associated with a first iteration variable a second bound associated with a second iteration variable, and a third bound associated with a third iteration variable, the address generator comprising:

a plurality of MUL-ADD units multiplying a first input with a second input to form a product and adding a third input to the product to form a MUL-ADD output;

a plurality of MUL units multiplying a first input with a second input to form a product;

a first MUL-ADD unit having a first input coupled to the convolution stride, a second input coupled to a unique iteration variable, and a third input coupled to a unique iteration variable;

a second MUL-ADD unit having a first input coupled to the convolution stride, a second input coupled to a unique iteration variable, and a third input coupled to a unique iteration variable;

a third MUL-ADD unit having a first input coupled to an output of the first MUL-ADD unit, a second input coupled to an output of the second MUL-ADD unit, and a third input coupled to the first bound;

a fourth MUL-ADD unit having a first input coupled to a unique iteration variable, a second input coupled to an output of the third MUL-ADD unit, and a third input coupled to a product of the first bound and the second bound;

a fifth MUL-ADD unit having a first input coupled to a unique iteration variable, a second input coupled to an output of the fourth MUL-ADD unit, and a third input coupled to a product of the first bound, second bound, and third bound;

an output of the fifth MUL-ADD coupled to a memory address input for accessing weights stored in the memory.

A fourth object of the invention is a programmable iteration loop generator comprising:
- a configurator receiving instructions;
- an iteration variable generator outputting a plurality of iteration variables, each iteration variable configured to count with a stride and a bound;
- an index variable selection fabric for remapping at least one iteration variable from the iteration variable generator to a different iteration variable;
- an input address generator converting iteration variables into an input address;
- a coefficient address generator converting iteration variables into a coefficient address;
- an output address generator converting iteration variables into an output address;
- at least one of the iteration variable generator, index variable selection fabric, input address generator. coefficient address generator, and output address generator receiving configuration information from the configurator.

SUMMARY OF THE INVENTION

A memory address generator generates addresses for accessing coefficients or input values stored in a memory. The memory address generator comprises an iteration variable generator for generating a plurality of independently incrementing iteration variables. In one example of the invention, each iteration variable has an associated bound and stride, and incrementing of an iteration variable to its associated bound causes a different iteration variable to increment. In one example of the invention, an index variable selection fabric maps at least one iteration variable to a different iteration variable. In one example of the invention, the iteration variables comprise inner iteration variables and outer iteration variables. The iteration variables are applied to one or more address generators, each address generator comprising a plurality of multiplier-adder (MUL-ADD) units having a first input, second input and third input and forming an output by multiplying the first input with the second input and adding the third input.

In one example of the invention, an iteration variable generator comprises a series of iteration loop variable generators (or iteration variable processes), each iteration loop variable generator (or iteration variable process) having an integer counter generating an output that counts from 0 to a bound value D (for example, representing a block size of associated data in a memory being addressed by the iteration variable), the integer counter having an output that is multiplied by a stride S, the counter having an increment input and an increment output, such that each counter asserts its increment output when the integer counter exceeds the bound, and each counter increments when it increment input is asserted.

In another example of the invention, a plurality of iteration variables (i1 ... in) from an iteration variable generator or iteration variable process, each iteration variable having a corresponding bound (D1 ... Dn) and stride (S1 ... Sn) is applied to an address generator, where the address generator generates an offset address of the form $(D_1 * D_2 * D_3 * \ldots * D_{n-1})*i_n + D_1 * D_2 * \ldots * D_{n-2})*i_{n-1} + \ldots + (D_1 * D_2)*i_3 + D_1 * i_2 + i_1$ and each iteration variable i increments by an associated stride S, and where n may be in the range 2 to 8 or more. In another example of the invention, at least one of the plurality of iteration variables increments by an integer greater than 0, and in another example of the invention, a memory address is generated by adding a memory start address to the product of the offset address and a data-size.

In another example of the invention, a first input value address generator (or input address process) is configured to generate an address for a memory containing input values, and a second input value address generator (or coefficient address process) is configured to generate an address for a memory containing coefficient values, and a third address generator is configured to generate an address for a memory for storing computational results such as a convolution of input values with coefficient values.

In another example of the invention, a sequence of computed addresses are provided for accessing input values and coefficient values stored in a memory for instant computation and storage of a result to the memory.

In another example of the invention, a sequence of addresses are generated and saved for future use, such as in a stream, a queue, or a memory dedicated for this purpose.

In another example of the invention, a configurator receives configuration instructions, each configuration instruction including at least one of an iteration stride and bound, an index variable map, one or more start addresses, one or more data size indicators, and one or more convolution strides. The configuration is coupled to a iteration variable generator which generates a plurality of iteration variables, each iteration variable having an associated bound and stride received from the configurator. The output of the iteration variable generator is optionally coupled to an index variable selection fabric for rearrangement of index variables according to a select map from the configurator. The iteration variables are provided to one or more address generators, each address generator receiving one or more iteration variables along with at least one of a start address, data size, and convolution stride and generating addresses for a memory. In one example of the invention, there is an input address generator, a coefficient address generator, and an output address generator. In another example of the invention, the input address generator generates an input address coupled to a random access memory (RAM), the coefficient address generator generates a coefficient address coupled to the RAM, and the output address generator generates an output address coupled to the RAM. The RAM retrieves input data associated with the input address, which is multiplied by coefficient data associated with the coefficient address, the resulting product is added to a value stored in the output address, and written back to the same output address. In this example of the invention, a machine-based convolutional neural network may be provided.

In another example of the invention, the iteration variable generator provides the generation of nested loop addresses for applications requiring iterating address values where inner nested variables increment before the increment of outer nested variables.

BRIEF DESCRIPTION OF THE DRAWINGS

FIG. 1A shows example executable RISC processor instructions for an iteration loop.

FIG. 1B is an equation for an example convolutional neural network.

FIG. 1C is an example of a seven loop convolutional neural network implementation of FIG. 1B.

FIG. 8A shows a generalized configuration instruction for the address generator of FIG. 2 or FIG. 9.

FIG. 8B shows an example configuration instruction for single vector operations.

FIG. 9A is a block diagram of an index variable selection fabric.

DETAILED DESCRIPTION OF THE INVENTION

In the present specification and figures, reference to a particular reference number indicates a reference to the same function or processing element in a description or view.

Figure 2:
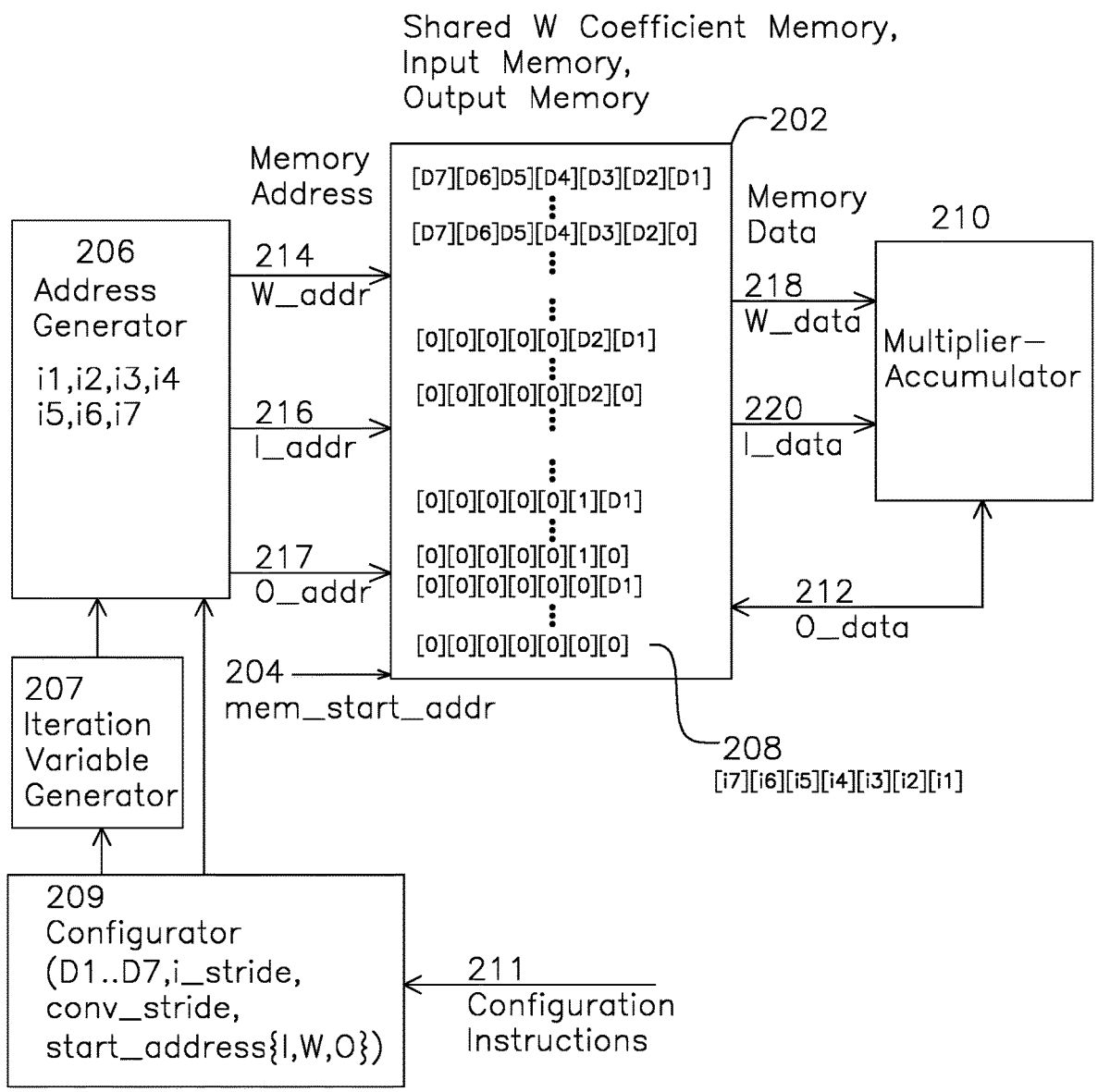
FIG. 2 is a block diagram for a first example of a convolutional neural network address generator, memory, and multiplier-accumulator (MAC).

FIG. 2 shows an example top level block diagram of a tensor address generator 206 receiving iteration variables i1 through i7 from iteration variable generator 207 and generating coefficient (W) memory addresses W_addr 214, input (IN) memory addresses I_addr 216, and output (O) memory addresses O_addr 217, which are respectively input to a single shared memory 202 containing addressable data with coefficients W, inputs I, and where the resulting outputs O are stored. Each of the iteration loops i1, i2, i3, i4, i5, i6, and i7 generated by iteration variable generator 207 has an associated bound D1, D2, D3, D4, D5, D6, and D7 defining an upper limit of an associated iteration variable, each associated bound also describing the number of entries for an associated respective iteration variable, in one example of the invention, where the iteration variable increments from 0 to the associated bound value D1, etc.

Accessing the multiple arrays and matrices creates a particular problem of computational complexity, as the addresses of the particular data elements to be accessed or read and written have to be calculated first. The computation involved in calculating the memory address of a data element is known as address arithmetic. In general, the memory address for a 1-dimensional memory array with n arrays of tensors such as the memory 202 of FIG. 2 may be computed as:

$$\text{mem\_addr} = \text{start\_addr} + \{(i_n-1)(D_n-1)(D_n-2) \ldots (D_1) + (i_{n-1}-1)(D_{n-2}) \ldots (D_1) + \ldots + (i_2-1)(D_1) + (i_1)\} * \text{data\_size} \quad \text{EQ-1}$$

where:
mem_addr is the desired memory location;
start_addr is the starting address of the memory;
$\{D_1 \ldots D_{n-1}\}$ are the respective number of entries of each memory segment representing a range of each associated iteration variables $\{i_1 \ldots i_{n-1}\}$, and
data_size is the word length for each data entry in the memory.

For example, if a memory containing three arrays of vectors or tensors (each having associated values for input IN, coefficient W, and output O) starts at byte address 4000 hex (the start_addr), and $D_1=D_2=D_3=64$ data_size words (256 bytes), and each element is 4 bytes (the data_size), the third element of the first array ($i_3=0$, $i_2=0$, $i_1=3$) is located at address=4000+(3−1)*4=4000+2*4=4008.

In processing systems with an instruction set processor, a compiler will generate the necessary instructions to perform the address arithmetic. FIG. 1A shows example RISC processor code for a single iteration loop highlighting the address arithmetic instructions for the single iteration loop case. FIG. 1A shows Reduced Instruction Set Computing (RISC) instructions to perform an address computation in software. The address arithmetic instructions are annotated "(ADDR)" in FIG. 1A. The first multiply "(MUL)" instruction multiplies the loop index 'i' with the size of the data (4 bytes in this example where a byte-addressed memory is assumed and 32-bit data is assumed). In the present examples, for clarity, the index starts from 0 as opposed to 1, so the computation can use index instead of index-1.

In the example RISC instructions of FIG. 1A, the data size is 4 bytes (32 bits). However, in deep learning applications the data size may be 32 bits or 16 or 8 or 4 or 3 or even just 1 bit. CPU compiler optimizations may optimize the sequence from what is shown in the FIG. 1A example code, but multiplications and additions are involved in computing the address, which may be modified for data size by well-known means.

In many applications, multiple tensors need to be simultaneously accessed from memory, requiring multiple iteration loops and multiple address generators. Having dedicated hardware to simultaneously compute address arithmetic for multiple tensors can improve accessing of data in tensor processing systems, and thereby the overall performance. Efficient accessing of data also improves energy efficiency.

The present invention provides hardware calculation of memory addresses for use by a Central Processing Unit (CPU), Graphics Processing Unit (GPS), or CNN engine, and those addresses may be used instantly, or captured as "pre-fetch" addresses for later use, by saving them in a stream, a queue, or a buffer. The term prefetching is generally used in the field to indicate anticipatory fetches before the address or data is actually needed or known to be needed. The timing at which the prefetching is initiated usually affects power and performance. If prefetches are done too aggressively, there may be many superfluous fetches resulting in wasted energy. In both instant fetching and prefetching, addresses have to be computed and the present invention facilitates the simultaneous access of multiple data streams while providing flexible programmability for various stream sizes and convolutional or index strides, where the stride indicates the number of locations to be skipped in each increment event. The present invention may be applied to many types of different sources or destinations for the fetched data, for example caches, registers, general purpose buffers and special purpose buffers.

FIG. 1B shows a generalized equation for a convolutional neural network, where tensor output maps 120 are formed by an activation function applied to biases 122, and a sum of input fmap terms 124 multiplied with filter weights 126 is formed, summed with a previous output value, and stored back to the output maps 120. Iteration variables $\{i_1, i_2, i_3\}$ are shown as inner iteration variables, with $i_1$ incrementing though its range, then $i_2$ incrementing and finally $i_3$, as is known in nested loop incrementing.

FIG. 1C shows example high level pseudo-code showing an implementation of the equation of FIG. 1B, where iteration variables which provide summing for the resultant multiply-accumulation of an input value from memory with a coefficient (W) value from memory, whereas the outer iteration variables $\{i_4, i_5, i_6, i_7\}$ are for generation of Output fmaps comprising values formed by the inner iteration variable convolution results and stored as output values in memory, where:

$D_7$ is the bound of $i_7$. In the CNN context, $D_7$ represents the number of input fmaps/output fmaps (also known as the batch size).

$D_6$ is the bound of $i_6$. In the CNN context, $D_6$ represents the number of 2-D output fmaps (also known as channels).

$D_5$ is the bound of is. In the CNN context, $D_5$ represents the width of the output fmap (number of activations).

$D_4$ is the bound of $i_4$. In the CNN context, $D_4$ represents the height of the output fmap (also known as the number of activations).

$D_3$ is the bound of $D_3$. In the CNN context, $D_3$ represents the height of the 2-D filter (weights), and is the bound associated with iteration variable $i_3$.

$D_2$ is the bound of $i_2$. In the CNN context, $D_2$ represents the width of the 2-D filter (weights).

$D_1$ is the bound of $i_1$. In the CNN context, $D_1$ represents the number of 2-D input fmaps/filters (channels).

U is the convolution stride.

$D_4$ (the height of the output fmap) is governed by the equation $D_4=(H-R+U)/U$, where H is the height of the input fmap and R is the height of the 2D-filter (weights). R is also equal to $D_3$.

$D_6$ (the width of the output fmap) is governed by the equation $D_5=(W-S+U)/U$, where W is the width of the input fmap and S is the width of the 2D-filter (weights). S is also equal to $D_2$.

Figure 3:
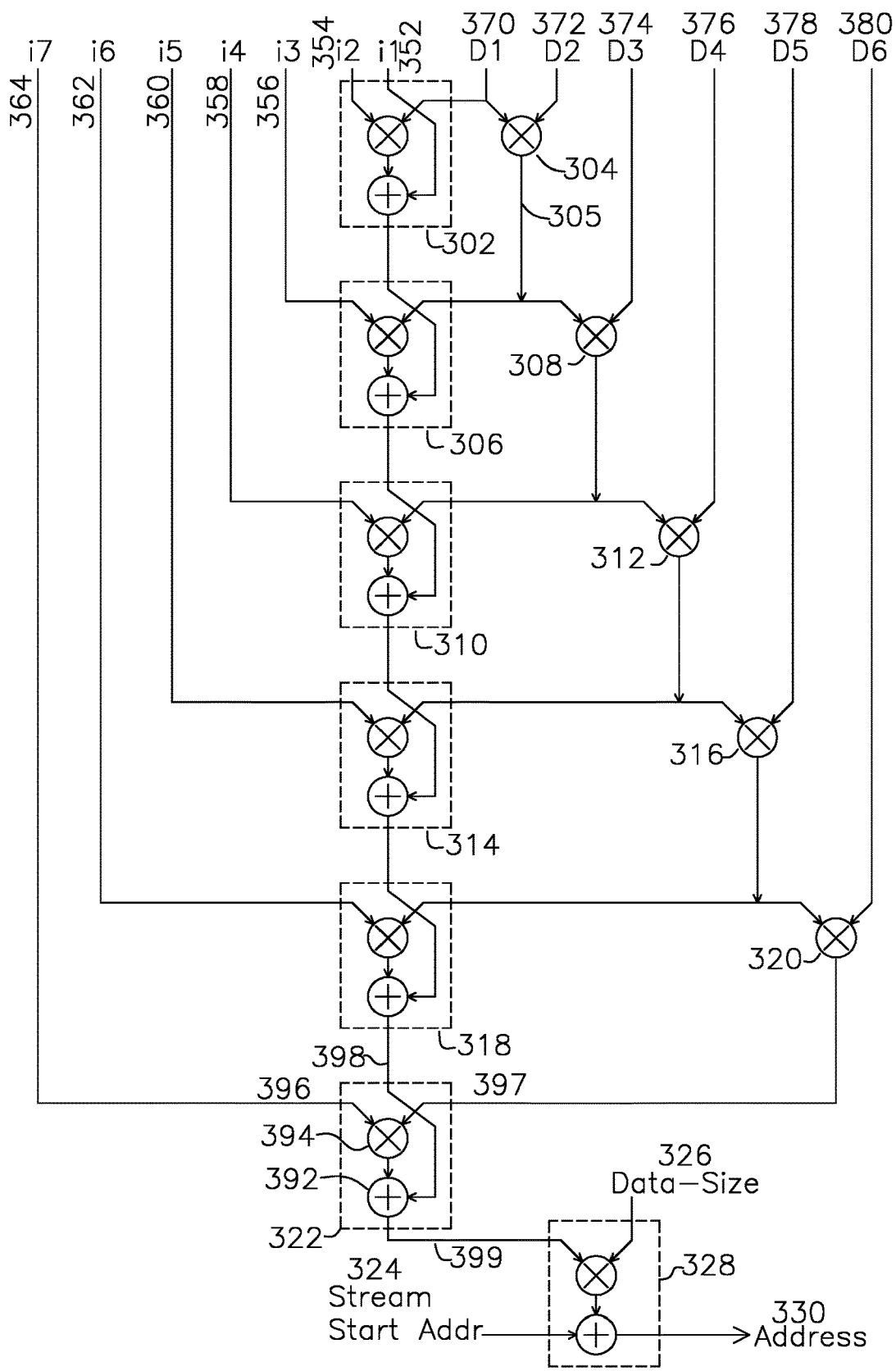
FIG. 3 is a block diagram for a generalized address generator.

FIG. 3 shows a generalized block diagram for an address generator 206 of FIG. 2, which performs the address computation of equation EQ-1 above. Iteration variables $I_1$ 352, $I_2$ 354, $I_3$ 356, $I_4$ 358, $I_5$ 360, $I_6$ 362, and $I_7$ 364 represent the respective iteration variables shown in FIGS. 1B and 1C and where iteration variable $I_n$ or $i_n$ are understood to represent the same variable. Respective iteration variable bounds $D_1$ 370, $D_2$ 372, $D_3$ 374, $D_4$ 376, $D_5$ 378, and $D_6$ 380 are fixed values corresponding to the loop bounds of respective iteration variables $i_1$ to $i_6$, respectively. In the CNN example, the iteration variable bound also describes a block size of corresponding coefficient values as shown in FIG. 2. A sequence of multiply-adders (MUL-ADD) 302, 306, 310, 314, 318, and 322 receive a cascaded summing value which is added to a product of two multiplication inputs, with the result output to a subsequent stage. For example, MUL-ADD 322 receives a summing value 398, and adds that summing value to a product of multiplication inputs 396 and 397 to form MUL-ADD output 399. The functionality of the other MUL-ADD blocks 318, 314, 310, 306, 302 is similarly arranged. Multiplier (MUL) elements 304, 308, 312, 316, and 320 each receive respective first and second inputs, multiply them, and form an output product to a subsequent stage. In FIG. 3, it can be seen that one of the multiplication inputs 305 is shared with a MUL-ADD stage multiplication unit 306 input, and the shared input is also an input to a subsequent multiplier element 312. In this manner, each of the iteration variables $i_1$ to $i_7$ and associated bound $D_1$ to $D_6$ (each representing an associated memory block size) are processed to form an address output 399 which is input to MUL-ADD stage 328, where the address output 399 is multiplied by data-size input 326 and added to the start_address 324 (representing the starting address 204 of FIG. 2), thereby forming the address output 330 which is used to address the memory, such as W address 214, IN address 216, or O address 217 of FIG. 2.

In one example of the invention, only three arrays (tensors) participate in the address computation for input (IN) address 216, coefficient (W) address 214, and output (O) address 217, with the innermost iteration variable loop ($i_1$, $i_2$, $i_3$) forming an output data vector O 120 for a given input tensor IN 124, and weight tensor W 126 with respect to the terms shown in FIG. 1B. In an example image detection application, the input vector IN represents a selection of pixels from an image, the weight vector W is the set of weights of a neural network, and the output vector O is the convolved image forming inference data.

In an extension of the single vector example, each of the vectors has multiple dimensions, such as 4. In that case, the output vector is $O[i_7][i_6][i_5][i_4]$, with input vector $IN[i7][i_1][U*i_5+i_3][U*i_4+i_2]$ and weight vector $W[i_6][i_1][i_3][i_2]$. Although there are only 4 index variables for each vector, the 4 indices of the 3 vectors are controlled by 7 nested loops.

In this example, $[i_7, i_6, i_5, i_4]$ are the outer iteration variables, and $[i_3, i_2, i_1]$ are the inner iteration variables, where $i_7$ is the outermost iteration variable and $i_1$ is the innermost variable of seven iteration loops.

The outer 4 iteration loops $[i_7, i_6, i_5, i_4]$ are for each output fmap value, i.e. the convolved output, and the inner 3 iteration loops $[i_3, i_2]$, convolve a window of the image. The ordering of the inner iteration loops may be permuted, as may the order of the outer iteration loops $[i_7 \ldots i_4]$. Alternatively, the iteration loops such as 208 may not be hierarchical and ordered in any manner without limitation to the scope of the invention.

Many optimizations are possible in this code sequence in the ordering of the convolutions, but the present example shows a 7-level nested loop structure for illustration only. It is understood that any number of outer loops may be added with four shown for example purposes only. The generated addresses for the associated data values for IN, W, and O depends on the indices of the 7 loops and the bounds of the dimensions.

The computation and memory accessing associated with CNNs can be improved by providing hardware support for the 7-level nested loop. The present example of the invention provides a 7 level hardware looping structure with stride (step size) for iteration loops $\{i_7, i_6, i_5, i_4, i_3, i_2, i_1\}$ of FIG. 1C. In one example of the invention, whether done by an apparatus or a process, the stride is the difference in address between successive array elements. For example, if individual array elements are 8 bit bytes at addresses 4000, 4004, 4008, etc., the address stride is 4 bytes, since the address increment is four bytes. In the case where individual array elements are bytes which are successively accessed, the stride is 1, and finer stride granularity may be realized.

Address computation involved multiplications and additions as shown in the address arithmetic equation. One basic structure is a multiply-add (MUL-ADD) unit which has three inputs A, B, C, and an output D, such that the output $D=A*B+C$ where A, B, C, and D are integer values. Another structure is a MUL unit, which has two inputs A and B, and an output C, such that the output $C=A*B$, where A, B, and C are all integer values. FIG. 3 shows an example MUL-ADD unit 322 with A and B multiplier inputs 396 and 397, respectively, and adder input C 398, such that output 399 is the product of multiplier inputs 396 and 397, the product of which is added to adder input 398. Other MUL-ADD units

302, 306, 310, 314, and 318 perform the same operations as was described for MUL-ADD unit 322. MUL unit 304 multiplies its two inputs $D_1$ 379 and $D_2$ 372 and generates output product 305. MUL units 308, 312, 316, and 320 operate in the same manner as was described for MUL unit 304. Alternatively, the functions of FIG. 3 may be performed by a process operating on a controller.

The block diagram of FIG. 3 may generally operate as an address generator 206 of FIG. 2, or may operate as an address generation process which performs the operations as described. The address generator of FIG. 3 inputs loop indices $i_1$ 352 thorough $i_7$ 394 and associated fixed data step size (iteration variable bound) $D_1$ 370 through $D_6$ 380, and uses MUL-ADD 302, 306, 310, 314, 318, and 322 to generate an index offset 399, which is multiplied by data size 326 and added to memory start address 324 to generate address 330 which is an address applied to a memory such as 202 of FIG. 2. The loop indices $i_1$ through $i_7$ may each be modified in a sequence as the convolution progresses. In one example, the loop indices are arranged to increment in an order from an inner loop iteration variable $i_1$ to an outer loop iteration variable $i_7$, and each sequence of a next outer loop is incremented when the adjacent inner loop completes a full cycle, each iteration variable incrementing by an iteration variable stride value.

Figure 4:
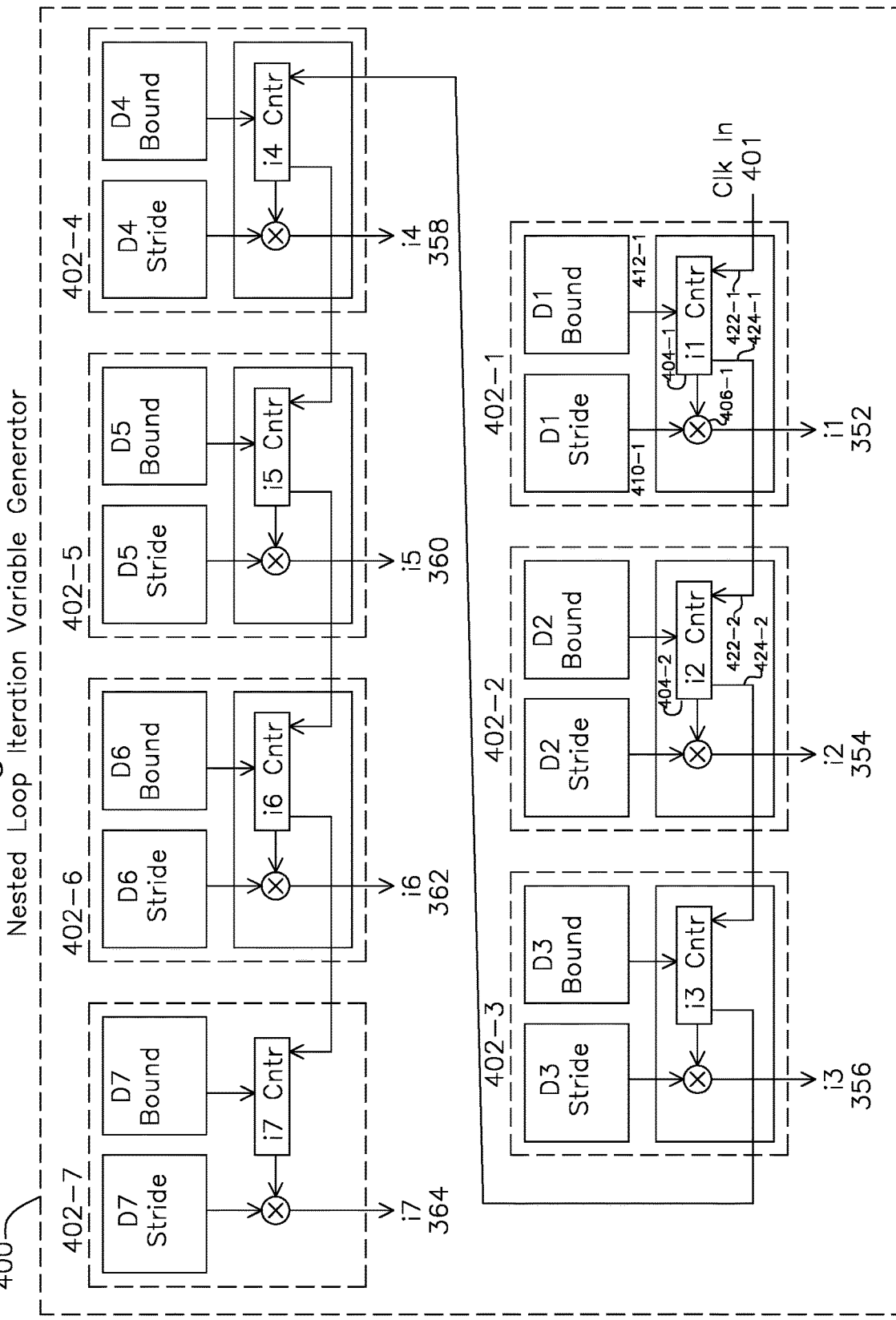
FIG. 4 is a block diagram for an iteration variable generator.

FIG. 4 illustrates an example for an iteration variable generator 400 (or iteration variable generation process) comprising iteration loop variable generators 402-1, 402-2, 402-3, 402-4, 402-5, 402-6, and 402-7, generating respective iteration variables $i_1$ through $i_7$, as was described for 207 in FIG. 2. Typically, a clock source 401 is coupled to the i1 counter 404-1 input. Each iteration variable from inner loop $i_1$, $i_2$, $i_3$, $i_4$, $i_5$, $i_6$ and outer loop $i_7$ increments by an associated stride after a previous iteration variable reaches its associated maximum count which is known as an associated iteration variable bound $D_1$, $D_2$, $D_3$, $D_4$, $D_5$, $D_6$, and $D_7$. Each of the iteration variable bound values $D_1$ through $D_7$ is a fixed value which is specific to a bound of an associated iteration variable $i_1$ through $i_7$, respectively.

The iteration variables $[i_7, i_6, i_5, i_4, i_3, i_2, i_1]$ may be considered "ordered iteration variables" in the sense that $i_1$ increments from 0 to its associated bound $D_1$ and resets to zero before iteration variable $i_2$ increments, and so on, with each iteration variable such as $i_2$ having a "higher order" adjacent iteration variable $i_3$ and a "lower order" adjacent iteration variable $i_1$, other than the lowest order ($i_1$ with no lower order iteration variable, and $i_7$ with no higher order iteration variable).

The number of iteration variables in the present examples is shown as n=7, but the range of iteration variables may be in a range from 4 to 10 or more, and each iteration variable may have a bitwidth in the range of 8 bits to 64 bits, although shown as 32 bits in the present examples.

Each iteration counter 402-1 through 402-7 increments according to an associated stride and also sends an increment signal to the next outer level iteration variable counter when it reaches its associated iteration variable bound, such that the subsequent iteration counter increments to a next value. For example, iteration counter 402-1 comprises counter 404-1 which increments through a range by stride 410-1 until i1 reaches bound D1 412-1, after which it asserts increment output signal 424-1, which is input to iteration variable counter 402-2 as increment input signal 422-2, causing $i_2$ counter 404-2 to increment by its $D_2$ stride value and $i_1$ counter 404 to reset to 0. The default stride for each of the iteration counters 402-1 through 402-7 is 1, but other strides can be supported by loading different values into 410-1 corresponding to a respective stride value. Each of the iteration variable counters 402-1 through 402-7 has an associated stride register such as 410-1 and bound 412-1 $D_1$ of iteration counter 402-1, which may be updated through a configuration process so that each CNN computation may have a corresponding set of stride values (of 410-1) and bound value (412-1).

In this manner, the 7-level nested loop of FIG. 1C can automatically run until all 7 levels of the loops, from inner loop to outer loop, have completed using only hardware mechanisms derived from FIGS. 3 and 4. Registers (general purpose or special purpose) are provided to hold the various strides and bounds of the iteration counters 402-1 to 402-7 of FIG. 4.

Figure 5:
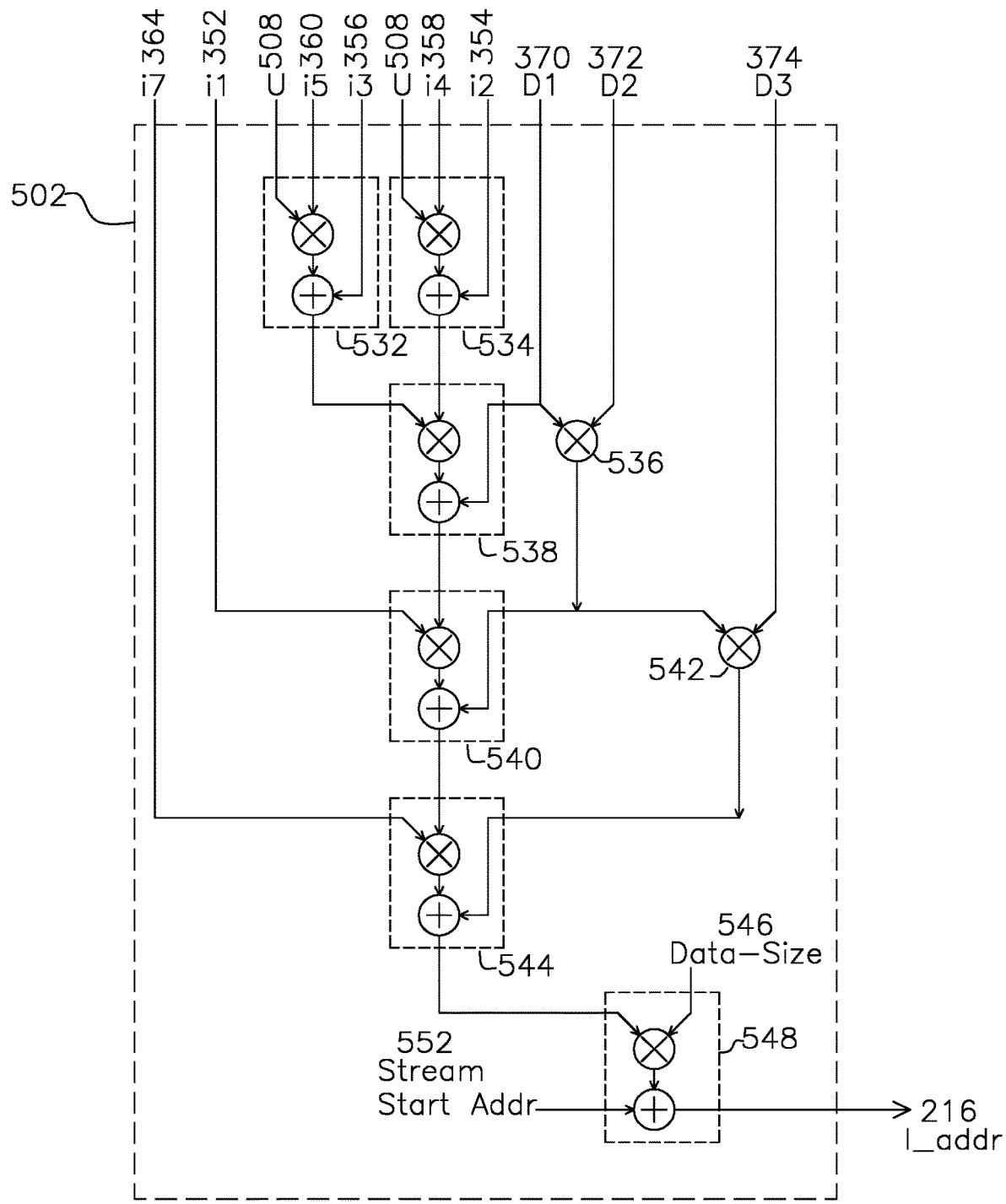
FIG. 5 is a block diagram for a tensor input address generator.
Figure 6:
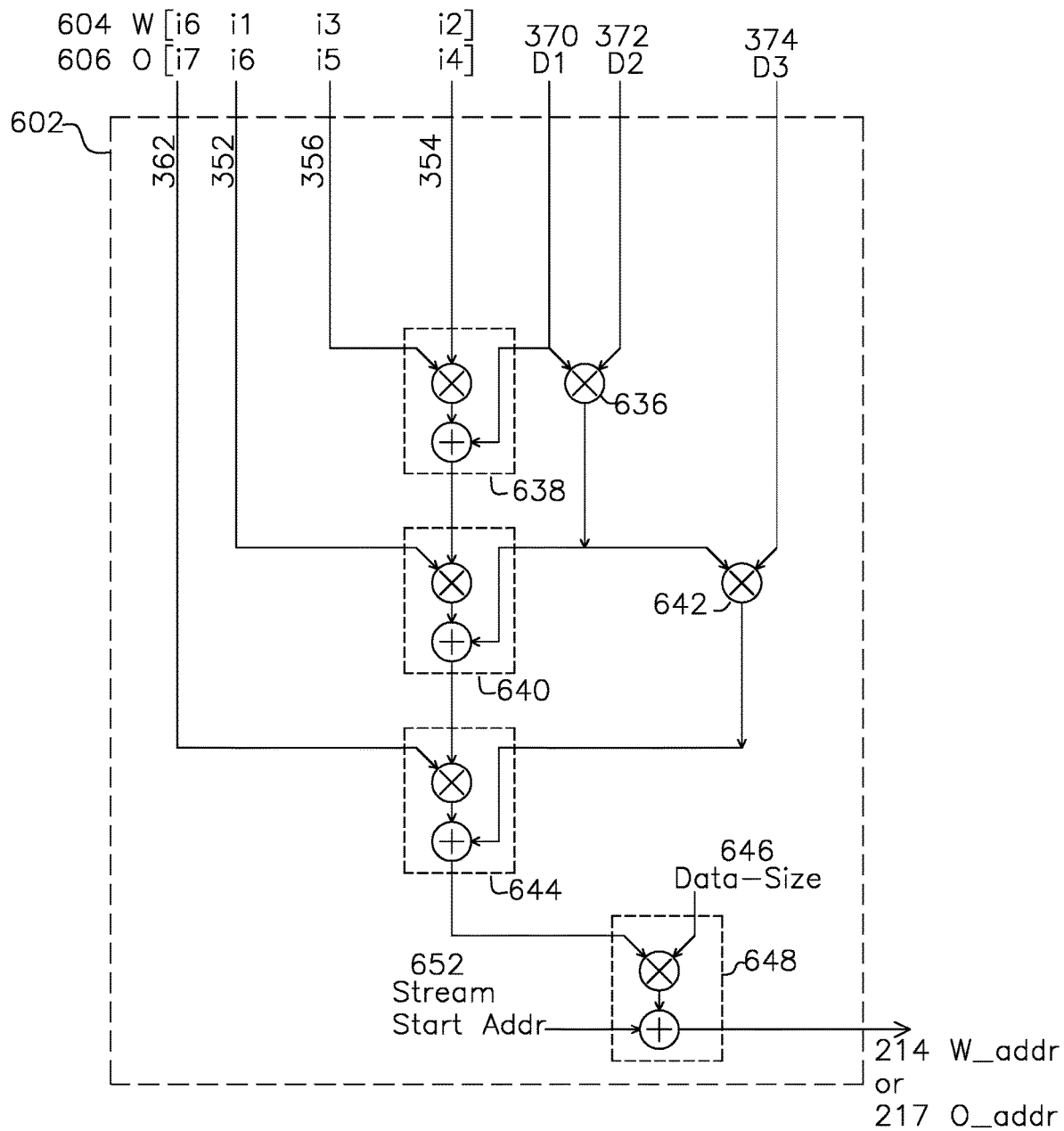
FIG. 6 is a block diagram for a tensor coefficient W address generator.

FIGS. 5 and 6 show respective address generators 502 and 602 for accessing the input (IN) values and coefficient (W) values, respectively, by generation of addresses for memory 202 of FIG. 2, each of which is coupled to a loop index generator such as the one described in FIG. 4. FIG. 5 shows MUL-ADD 532 computing $U*i_5+i_3$ and MUL-ADD 534 computing $U*i_4+i_2$ components of term 124 of FIG. 1B, with the remaining MUL-ADD stages 538, 540, 544 and MUL stages 536 and 542 generating an index to MUL-ADD 548 which multiplies an input by data-size 546 and adds the memory start address 552 to generate the input_address 216 output. It may be noticed that the input vector IN 124 of FIG. 1B has a 4-dimensional index $[i_7] [i_1] [U*i_5+i_3] [U*i_4+i_2]$ in the convolution equation of FIG. 1B. The 2 innermost loop terms are $(U*i_5+i_3)$ and $(U*i_4+i_2)$, where U is known as the convolution stride. The convolution stride stems from the fact that the invention provides flexibility through modification of convolutional stride input U to change the convolution window to a few pixels in each step rather than moving to the next pixel of an input image.

FIG. 6 shows a similar block diagram for a weight W address generator such as 206 generating W address 214 from W iteration variables of 604, and, by rearranging the iteration variable inputs as shown in 606, to generate the O address output 217 using the same structure, which may be done using the same address generator 602 at a different time from the W address computation, or by using a separate address generator 602 with different iteration variable inputs, as indicated by 604 and 606 for corresponding W output 214 and O output 217. For the W address, iteration inputs $i_1$, $i_2$, $i_3$ and $i_6$ are multiplied and added as shown in the block diagram 602 to generate W_ddress 214, and corresponding to the term 126 of FIG. 1B. The output maps 120 of FIG. 1B are located at the corresponding addresses derived from the arrangement 606 of iteration variables $[i_7] [i_6] [i_5] [i_4]$ of term 120 of FIG. 1B after the convolution function driven by iteration variables $i_1$ to $i_3$ completes. Each memory address generator output I_addr, W_addr, O_addr relying on iteration variables $i_1 \ldots i_7$ forms an address to access corresponding input, coefficient, or output data, respectively, for performing a convolution of the input maps 124 with the filter weights 126 according to configurable parameters which include the convolution stride, the respective iteration variable stride, and optionally other parameters to generate the output maps 120 for storage in locations identified by the output address O_addr 212.

When performing a convolution operation, the address generator 206 generates W_addr 214 and O_addr 217 using address generator 602, and I_addr 216 using address generator 502, causing the memory 202 to generate W_data 218 based on W_addr, I_data 220 based on I_addr, and provides the O_data 212 based on O_addr 217. The multiplier accumulator 210 multiplies the I_data 220 and with W_data 218, adds that product to the value O_data 212 to generate new O_data, and stores the new O_data result back to the memory using the same O_addr location, and moves on to the next set of operations associated with the next set of iteration variables.

Figure 7A:
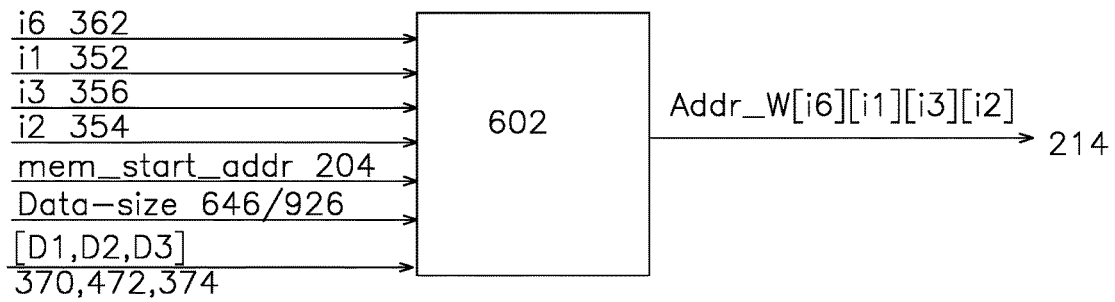
FIGS. 7A, 7B, and 7C are block diagrams showing address generators for coefficient W, input IN, and output O tensors, respectively.
Figure 7B:
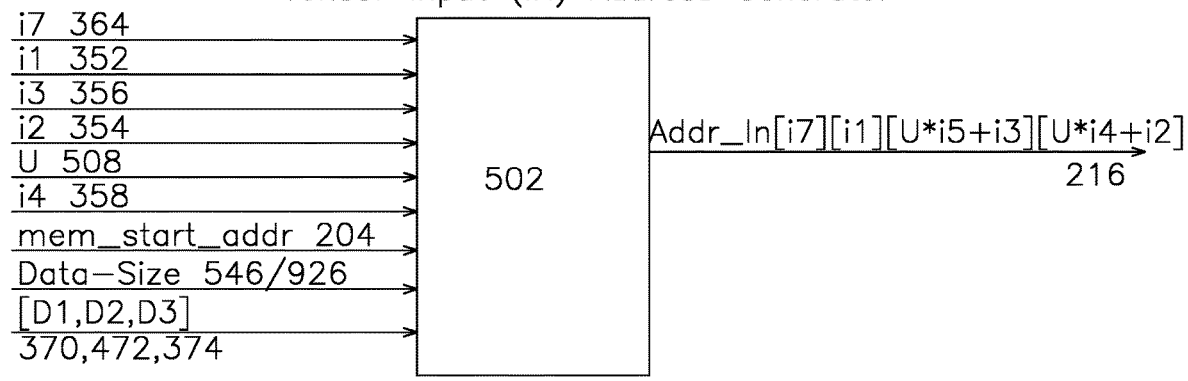
Figure 7C:
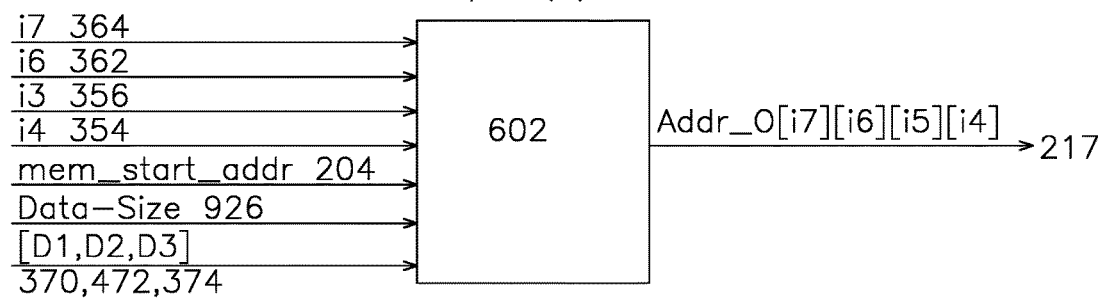

FIG. 7A shows the W coefficient tensor address generator such as 602 using the 604 group of iteration variables, FIG. 7B shows the IN tensor address generator such as 502, and FIG. 7C shows the OUT tensor address generator such as 602 using the 606 group of iteration variables, each address output corresponding to the respective terms of the equation of FIG. 1B. Each of the input (IN) address generator such as 502, coefficient (W) address generator and output (OUT) address generators 602 may be actualized as an apparatus or process performing the functions of the apparatus.

In one example of the invention, a single set of iteration variables, associated iteration stride constants, start address constants, and data size constants are applied to the address generators of FIGS. 7A, 7B, and 7C, and the addresses are applied to the memory and the computed addresses 214, 216, 217 and/or memory outputs 218, 220, and 212 are variously:
1) stored into a cache memory for a pre-fetch operation, where the addresses are saved for future use;
2) stored into a queue of access addresses for a pre-fetch operation, where the addresses are saved for future use;
3) stored into a wide interleaved buffer for a tensor controlled by nested loops;
4) applied for immediate use in addressing IN and W tensors, and determining the O address for stream buffers for later use in computing the associated tensor;
5) applied for immediate use in addressing IN and W tensors, and determining the O address for instant storage of the result to an O address;
6) computing the IN, W, and O addresses, and loading the associated addressed tensors into respective separate stream buffers;
7) computing the IN, W, and O addresses, loading the associated tensors simultaneously into three queues.

The address generation hardware above can be incorporated into a dedicated access processor, a CPU, a GPU or in a custom accelerator. The address generation hardware can work in conjunction with any access processor or unit. An access processor can be an ordinary processor such as a CPU focusing on access tasks in parallel to the main compute processor. Or, an access processor can be designed with special addressing modes and buffering to stage data in the order required for computations (100% correctness needed); buffers can be parallel enough to provide high data bandwidth required for all computations of the execute processor. Different streams (tensors) can be in different buffers allowing parallel access. The different tensors can be simultaneously loaded, and simultaneously used by the compute processor or accelerator. An access processor can be designed to prefetch data into caches and local memories accessible by the Execute Processor in an advisory fashion. In this case, not all data fetched may be used by the execute processor. In this case 100% correctness is not needed for the fetching processor.

The access unit or the access processor can be programmable with certain sophisticated access pattern instructions. For example, for 3-dimensional tensors, 4-dimensional tensors, or 6-dimensional tensors. In the convolution loop presented above, there are three 4-dimensional tensors O, I and W corresponding to output, input and weights, respectively, and a 1-dimensional vector B (bias). Multiple instances of the hardware can be used in the access processor as described for FIGS. 7A, 7B, and 7C to allow simultaneous input stream access, i.e. simultaneous access of multiple tensors. If only one instance of the hardware is used, addresses for the vectors can be generated in a serial fashion for later use. Use of multiple copies of the hardware allows to generate the various address streams in parallel so that all the addresses are generated in parallel and the full memory bandwidth can be utilized. In one example of the invention, address generator 206 is split into three separate address generators 206A, 206B, 206C (not shown), which generate respective W_addr 214, I_addr 216, and O_addr 217, using a single variable generator 207 and loop variable configurator 209.

Figure 9:
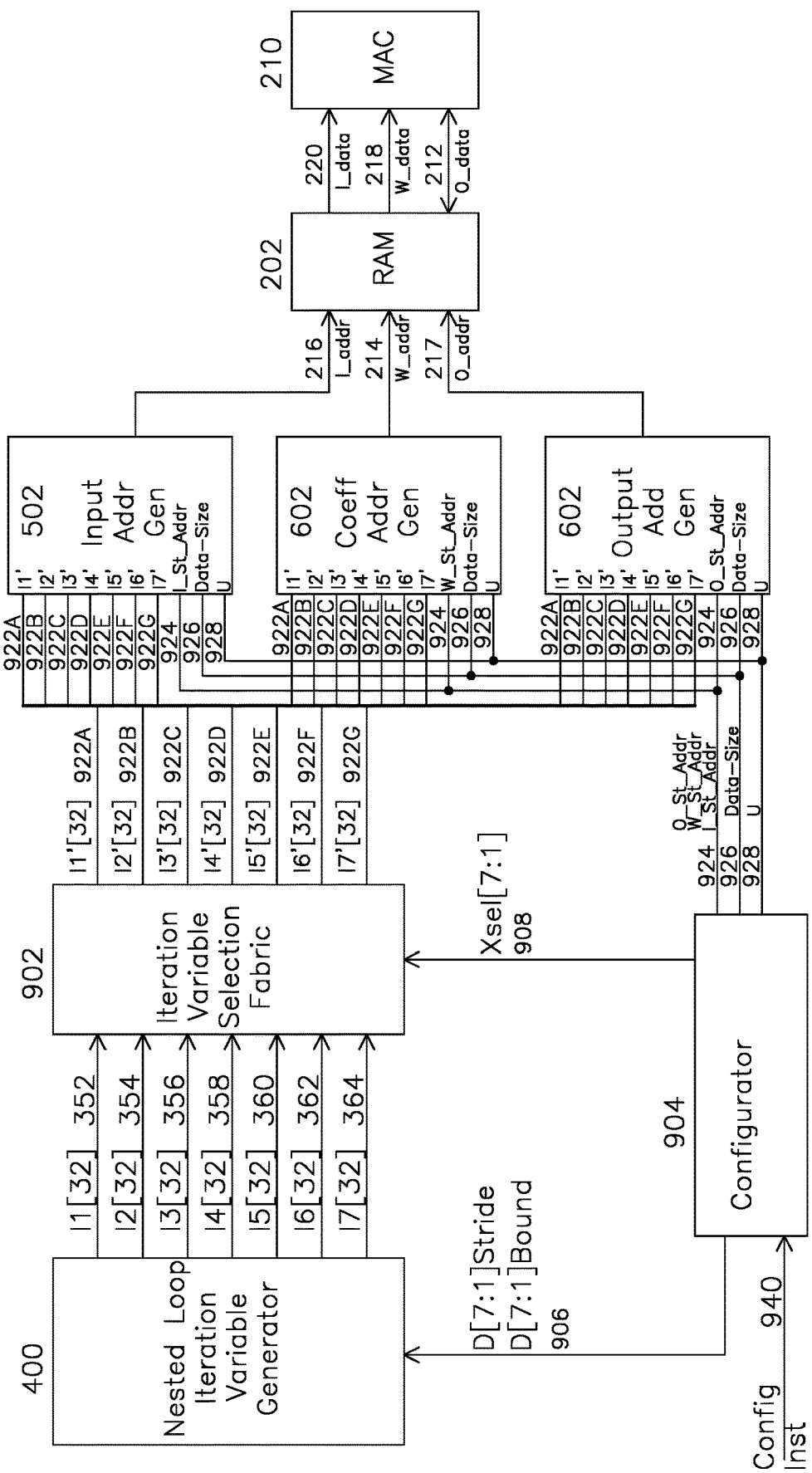
FIG. 9 is a block diagram of an example of a fully programmable and reprogrammable iteration loop configured to perform convolution.

FIG. 9 shows an example fully programmable and reconfigurable iteration loop receiving configuration instructions from configurator 904 which provides configuration information for each of the associated structures as shown. A nested loop variable generator 400 functions as was described in FIG. 4, generating iteration variables $i_1$ 252, $i_2$ 354, $i_3$ 356, $i_4$ 358, $i_5$ 360, $i_6$ 362, and $i_7$ 364, each of which is shown as a 32 bit value for example purposes. Each of the iteration variables has an associated stride and bound provided by configurator 904 output 906. In one example of the invention, iteration variable selection fabric 902 re-routes each iteration variable input 352, 354, 356, 358, 360, 362, and 364 to a selected iteration variable output $i_1'$ 922A, $i_2'$ 922B, $i_3'$ 922C, $i_4'$ 922D, $i_5'$ 922E, $i_6'$ 922F, and $i_7'$ 922G. The iteration variable selection fabric 902 performs a 1 input to 1 output mapping for each iteration variable input. For example, $i_1$ can be mapped to output at any of $i_1'$ through $i_7'$ through an associated selector input $X_{sel1}$ 908, as may any of the other independently mappable inputs $i_2$ through $i_7$ on a single input to single output basis. For clarity of understanding only, the iteration variable mapping is described where $i_1'=i_2$, $i_2'=i_2$, $i_3'=i_3$, $i_4'=i_4$, $i_5'=i_5$, $i_6'=i_6$, and $i_7'=i_7$. It is understood that the iterations of FIG. 1B may be performed in any order by reassignment of iteration variable assignment. For example, where a single instance of address generator 602 is used to alternatively compute W address 214 and O address 217, the iteration variable selection fabric may be used to switch between mapping $[i_6, i_1, i_3, i_2]$ of W variables 604 and $[i_7, i_6, i_5, i_4]$ of O variables 606.

In another example of the invention, each address generator of FIGS. 7A, 7B, and 7C has an associated iteration variable selection fabric 902 which maps the ordered iteration variables to corresponding address generator iteration variables as required for each separate address generator.

FIG. 9A shows an example index variable selection fabric, where each $X_{sel}$ input $X_{sel1}$ 908A through $X_{sel7}$ 908G is input to an associated multiplexer 920A, 920B, 920C, 920D, 920E, 920F, and each associated multiplexer selects $i_1$ 352 through $i_7$ 364 input to form each of the mapped iteration variable $i_1'$ 922A through $i_7'$ 922G outputs. In some examples of the invention, only the minimum number of multiplexers required to perform a remapping are used, such as eight multiplexers for the two sets of four iteration variables 604 and 606.

Returning to FIG. 9, each of the input address generator (IN) 502, coefficient address generator (W) 602, and output address generator (O) 602 receives the $i_1'$ 922A through $i_7'$ 922G optionally mapped index variables, or a subset of the unmapped or mapped iteration variables, as was previously described. Example input address generator (IN) 502 uses $i_1'$ 352, $i_2'$ 354, $i_3'$ 356, $i_4'$ 358, $i_5'$ 360, and $i_7'$ 364. Configurator 904 also provides convolution stride U 928 (508 of FIG. 5), Start Address 924 (552 of FIG. 5), and Data Size 926 (546 of FIG. 5). Coefficient address generator 602 similarly receives $i_1'$ 352, $i_2'$ 354, and $i_6'$ 362, and associated bounds $D_1$ 370, $D_2$ 372, and $D_3$ 374, and associated data size 646 and stream start address 652. Output address generator 906 uses $i_7'$, $i_6'$, $i_5'$, and $i_4'$, as shown in the equations of FIG. 1C.

As was previously described for FIG. 2, the input variable IN address 216 is applied to RAM 202 to provide IN data 220 along with coefficient W address 214 providing W data 218, which are multiplied together, added to the O data 212 selected by O address 217, and the accumulated sum of FIG. 1B is written back to the same O_addr 217.

The architecture of FIG. 9 is useful in the case where the CNN performs a series of computations, each of which has different values for each of the bounds of $D_1$, $D_2$, $D_3$, $D_4$, $D_5$, $D_6$, and $D_7$ chosen for this example. Each of the associated iteration variables $i_1$ through $i_7$ may also have different iteration variable strides (410-1 of the $i_1$ iteration variable generator 400 of FIG. 4), different iteration variable bounds ($D_1$ 412-1 of FIG. 4) iteration stride $S_1$, and unique starting addresses for each start address of each of the IN 216, W 214, and O 217 memory addresses of FIGS. 7A, 7B, and 7C. The iteration variable bound constants $D_1$ to $D_6$ (i.e. 412-1 of 402-1), and iteration stride constants (i.e. 410-1 of 402-1) for $i_1$ to $i_7$ shown in FIG. 4, and convolution stride U 508 of FIG. 5, as well as memory starting address 552, 562 for each computational event over all or part of the iteration variable space may be output by the configurator 209 of FIG. 2 at the start of a computation in response to a received instruction which contains the iteration constants shown as generated by configurator 904 of FIG. 9.

Figure 8C:
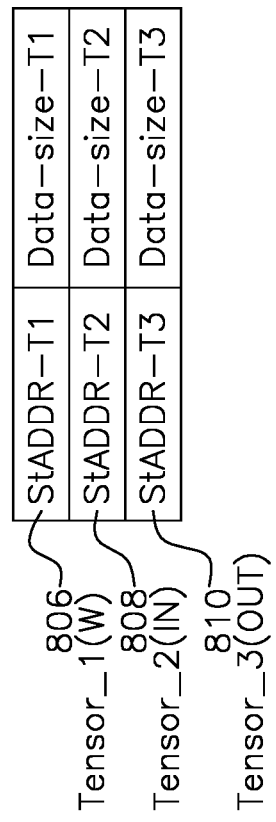
FIGS. 8C and 8D show an example configuration instruction for providing addresses for three vectors at a time.
Figure 8D:
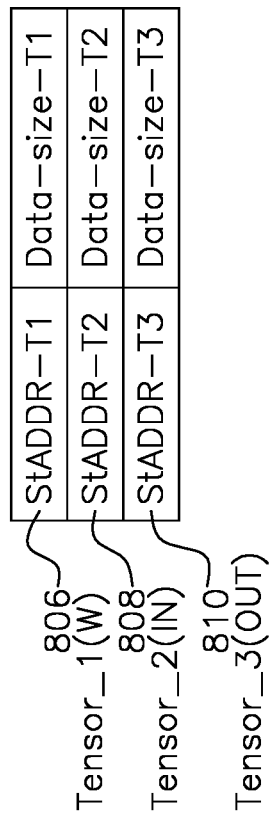

FIG. 8A shows a generalized configuration instruction applied to the input 211 of configurator 209 of FIG. 2 or input 940 of configurator 904 shown in FIG. 9. In the present examples, the configuration instructions shown in FIG. 8A have a column containing configuration constants for each iteration loop configuration, each iteration loop configuration shown in the row 804 containing iteration variable stride, bound D 802 value, and associated start address, data size, and convolution stride U on a per-tensor basis 806, 808, and 810. These constants over a computational cycle may be provided as a configuration instruction to input 211 of FIG. 2 or 940 of FIG. 9 and received by the respective configurator 209 or 904 for reconfiguration of the iteration variable generator of FIG. 4 and address generator parameters of FIGS. 5 and 6. Where the addresses for the three tensors (IN, W, O) are generated concurrently, the configuration of FIG. 8A, 8B, or 8C which provide configuration constants for each of the three iteration variable and address generators may be used.

FIG. 8B shows an example configuration instruction where each row 802, 804, 805 has a series of associated iteration variable field such as 820 which includes a Bound 802 and Stride 804 as before for each iteration variable generator, and for a single address generator system, has an address generator constant convolution stride 822, and has programmable fields 822, 824, and 826 for variables associated with a particular address generator. For example, the fields 822, 824, and 826 may be used on address generator 502 to specify U 508 for the convolution stride generating $U*i_5+i_3$ or $U*i_4+i_2$ when using FIG. 5, or for a case where only FIG. 5 is generating all addresses for IN, W, and O, then the field 822 U1=1, the field indicated as x1-1=0 and the field indicated as x1-2=0 can be used to generate addresses for the W and O address generators.

In one example of the invention, the index variable selection fabric is not used, and each variable $i_1'$, $i_2'$, etc is equal to $i_1$, $i_2$, etc respectively and multiplexers 920A to 920G are not necessary. In another example of the invention, the configuration instruction of FIGS. 8A, 8B, 8C, and 8D include iteration variable field mapping, and the indices $\{i_1, i_2, i_3, \ldots, i_7\}$ can be encoded as mask bits. For example the loop indices from inside, assuming loop 1 is the outermost and loop 7 is the innermost and the bounds for $i_1$ through $i_7$ are $D_1$ through $D_7$, respectively.

Indices can be indicated by the following full mask vectors.

$i_7$=1000000
$i_6$=0100000
$i_5$=0010000
$i_4$=0001000
$i_3$=0000100
$i_2$=0000010
$i_1$=0000001

Alternatively, references to an iteration variable can be encoded in 3 bits, where $i_1$ is represented as $\{001\}$ and $i_7$ is represented as $\{111\}$.

Accordingly, when (U, $i_5$, $i_3$) need to be indicated as the index meaning that the index is $U*i_5+i_3$, the encoded scheme can use 3 bits to reference iteration variable is, 3 bits to reference iteration variable $i_3$, and 1 bit to indicate whether U should be used (or provide a non-zero multi-bit value for U), and start addresses (StADDR-T1, StAddr-T2, StAddr-T3) are the same width as the address they specify.

Many conventional optimizations are possible to reduce the number of bits used to encode this instruction. But encoded full vectors are also useful to reduce the time spent to decode the information later for processing. In some scenarios it will be advantageous to use encoding and fewer bits. In other scenarios it will be advantageous to not use encoding but use the full amount of bits for the unencoded information.

Instructions can be devised for demand loading as well as prefetching. In addition to the examples shown, other types of instructions can be created for processing by the configurator 211 coupled to the address generator 206 and iteration variable generator 207, including the specification for storage or use of the resulting addresses generated by the address generator 206, including:

1) PREFETCH into cache a tensor controlled by indexing of 6 or more nested loops
2) PREFETCH into queues a tensor controlled by many nested loops
3) PRFETCH into wide interleaved buffer a tensor controlled by many nested loops
4) PREFETCH 3 tensors simultaneously into 3 stream buffers
5) PREFETCH 3 tensors simultaneously 3 queues
6) Load 3 tensors simultaneously into 3 stream buffers
7) Load 3 tensors simultaneously 3 queues Each of the embodiments of the preceding examples may be performed by processes. For example, the iteration variable generator may be operative as a sequence of iteration variables generated by respective iteration variable generation processes, a first iteration variable generator counting by an associated stride S and returning to 0 when reaching an associated bound D, and also generating a carry output to increment a subsequent stage. In this manner, the iteration variables may be generated by a series of processes which perform as shown in FIG. 4. For example, a first process 402-1 may perform the functions of incrementing by a stride 410-1 until reaching a bound D1 412-1, with counter 404-1 generating the iteration variable. Similarly, the address generation functions performed by 206 of FIG. 2 or 3 may be generated by a process which generates an output address offset $(D_1*D_2*D_3* \ldots *D_{n-1})*i_n+D_1*D_2* \ldots *D_{n-2}*i_{n-1}+ \ldots +(D_1*D_2)*i_3+D_1*i_2+i_1$.

In another example of the invention, the input address generator of FIG. 5 and weight/output address generator of FIG. 6 may be performed by an address generation process which relies on multiplication and addition operations performed by a controller configured to perform multiplication and addition operations.

The present examples are provided for illustrative purposes only, and are not intended to limit the invention to only the embodiments shown. In the present description, the use of ellipses such as "$i_1 \ldots i_7$", "$D_1 \ldots D_7$", etc are understood to refer to a set of coefficients or values such as $\{i_1, i_2, i_3, i_4, i_5, i_6, i_7\}$ and $\{D_1, D_2, D_3, D_4, D_5, D_6, D_7\}$, respectively.

We claim:

1. A programmable address generator comprising:
    an iteration variable generator outputting a plurality of ordered iteration variables, each iteration variable of a higher order incrementing after an adjacent iteration variable of a lower order increments to a bound associated with each iteration variable, thereafter the iteration variable of the lower order resetting to zero;
    the ordered iteration variables coupled to an iteration variable selection fabric configured to map at least one ordered iteration variable to a selection fabric iteration variable output;
    one or more outputs of the iteration variable selection fabric coupled to at least one address generator forming an address from the one or more outputs of the iteration variable selection fabric;
    a configurator operative to receive an iteration instruction comprising at least one iteration variable bound, at least one iteration variable stride, at least one iteration variable selection fabric configuration, a data size, and a start address, the configurator coupling the at least one iteration variable bound and at least one iteration variable stride to the iteration variable generator, the configurator coupling the at least one iteration variable selection fabric configuration to the iteration variable selection fabric identifying a coupling of an ordered iteration variable to a selection fabric iteration variable output, and the data size and the start address coupled to the at least one address generator indicating a start address and a data size of the address generated by the at least one address generator;
    and where the at least one address generator computes an address derived from an offset address, the offset address equal to:

$(D_1*D_2*D_3* \ldots *D_{n-1})*i_n+D_1*D_2* \ldots *D_{n-2})*i_{n-1}+ \ldots +(D_1*D_2)*i_3+D_1*i_2+i_1$.

where $D_1, D_2, \ldots D_{n-1}$ are associated iteration variable generator bounds, $i_1, i_2, \ldots, i_n$ are associated iteration counts, and n is a value in a range of 2 to 8;
    and wherein i and n are positive integers.

2. The programmable address generator of claim 1 where the iteration variable generator comprises a plurality of iteration counters arranged in a sequence, each iteration counter incrementing by an associated iteration counter stride for each particular iteration counter until reaching an associated iteration counter bound, thereafter incrementing an adjacent higher order iteration variable generator and resetting the particular iteration counter to zero.

3. The programmable address generator of claim 1 where the iteration variable generator comprises:
    a plurality of iteration variable counters, each iteration variable counter comprising:
        an increment input and an increment output coupled to a different iteration variable counter increment input;
        a stride value indicating an amount by which an associated iteration variable counter should increment when an increment input for the associated iteration variable counter is asserted;
        a bound value, which when met or exceeded by a count of an iteration variable counter, causes the iteration variable counter to reset to zero and assert the increment output whereby an adjacent higher order increment counter increments by an associated stride.

4. The programmable address generator of claim 3 where each iteration counter stride and each iteration counter bound is extracted from a field of an instruction received by the configurator.

5. The programmable address generator of claim 1 where the iteration variable selection fabric comprises a plurality of multiplexers, each multiplexer configured to receive a map contained in a field of an instruction received by the configurator, each multiplexer configured to couple a particular ordered iteration variable input to a particular iteration variable output of the iteration variable selection fabric.

6. The programmable address generator of claim 1 where a number of address generators is one, two, or three.

7. A programmable address generator comprising:
    an iteration variable generator;
    a plurality of address generators, each address generator coupled to an iteration variable selection fabric for mapping of iteration variables coupled to a respective iteration variable generator;
    a memory coupled to the plurality of address generators;
    a configurator receiving configuration instructions as a plurality of fields, the configuration instructions including an iteration variable generator configuration comprising a bound and a stride for each individual iteration variable;
    an iteration variable selection fabric configuration determining a mapping from an iteration variable to an address generator input;
    where a first address generator is configured to generate an address using positive integer iteration variables [$i_7, i_1, i_5, i_3, i_2, i_4$], and convolutional stride U.

8. The programmable address generator of claim 7 where the iteration variable generator comprises:
    a plurality of iteration variable counters, each iteration variable counter comprising:
        an increment input and an increment output coupled to a different iteration variable counter increment input;
        the convolutional stride value U indicating an amount by which the iteration variable counter increments when an increment input for the iteration variable counter is asserted;
        a bound value indicating a maximum value of an associated iteration variable counter and causing the iteration variable counter to reset to zero and assert the increment output when the bound value is reached;
        the stride value and the bound value for each iteration variable counter provided by a value in a field in the configuration instruction received by the configurator;
        each iteration variable counter incrementing upon assertion of an associated increment input.

9. The programmable address generator of claim 7 where each address generator generates an address from a plurality of iteration variables, the address equal to:

$$(D_1 * D_2 * D_3 * \ldots * D_{n-1}) * i_n + D_1 * D_2 * \ldots * D_{n-2}) * i_{n-1} + \ldots + (D_1 * D_2) * i_3 + D_1 * i_2 + i_1.$$

where $D_1, D_2, \ldots D_{n-1}$ are associated iteration variable generator bounds, and said iteration variables $[i_7, i_1, i_5, i_3, i_2, i_4]$ are from the variable selection fabric according to the variable selection fabric map.

10. The programmable address generator of claim 7 where a second address generator has a first mode configured to generate an address using iteration variables $[i_6, i_1, i_3, i_2]$ and a second mode configured to generate an address using iteration variables $[i_7, i_6, i_5, i_4]$.

11. The programmable address generator of claim 10 where the iteration variables of the first mode and the iteration variables of the second mode are selected using a configuration of the iteration variable selection fabric from the configurator according to an instruction received by the configurator.

12. The programmable address generator of claim 7 where address generator outputs are stored for later use.

13. The programmable address generator of claim 7 where address generator outputs forming an IN tensor address, a W tensor address and an OUT tensor address are applied to the memory for performing an arithmetic operation.

14. The programmable address generator of claim 13 where the arithmetic operation is a multiply-accumulate operation.

15. The programmable address generator of claim 8 where at least one of the plurality of address generators is configured to generate an address using four iteration variables contained in a configuration instruction and provided by the configurator.

16. The programmable address generator of claim 8 where at least one of the plurality of address generators is configured to generate an address using four iteration variables and the convolution stride value U is contained in a configuration instruction and provided by the configurator.

17. The programmable address generator of claim 8 where each address generator of at least three address generators of the plurality of address generators is configured to use four or more iteration variables received from the configurator and which were contained in a configuration instruction.

18. The programmable address generator of claim 8 where each address generator of at least three address generators of the plurality of address generators is configured to generate an address using four or more iteration variables received from the configurator, and at least one of the address generators also receives a convolution stride value.

* * * * *